(12) United States Patent
Tang et al.

(10) Patent No.: US 11,286,855 B2
(45) Date of Patent: Mar. 29, 2022

(54) SYSTEMS AND METHODS FOR OPERATING A TURBINE ENGINE

(71) Applicant: General Electric Company, Schenectady, NY (US)

(72) Inventors: Ching-Jen Tang, Watervliet, NY (US); Nilesh Tralshawala, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 382 days.

(21) Appl. No.: 16/354,412

(22) Filed: Mar. 15, 2019

(65) Prior Publication Data
US 2020/0291857 A1 Sep. 17, 2020

(51) Int. Cl.
*F02C 7/143* (2006.01)
*F02C 7/057* (2006.01)
*F02C 3/06* (2006.01)

(52) U.S. Cl.
CPC ........... *F02C 7/143* (2013.01); *F02C 3/06* (2013.01); *F02C 7/057* (2013.01); *F05D 2260/213* (2013.01); *F05D 2270/053* (2013.01); *F05D 2270/11* (2013.01); *F05D 2270/303* (2013.01)

(58) Field of Classification Search
CPC .................................. F02C 7/057; F02C 7/143
See application file for complete search history.

(56) References Cited

U.S. PATENT DOCUMENTS

| 5,083,423 | A | 1/1992 | Prochaska et al. |
|---|---|---|---|
| 6,474,069 | B1 | 11/2002 | Smith |
| 6,805,483 | B2 | 10/2004 | Tomlinson et al. |
| 8,127,547 | B2 | 3/2012 | Norris et al. |
| 8,141,369 | B2 | 3/2012 | Nuding et al. |
| 8,266,910 | B2 | 9/2012 | Feher et al. |
| 9,121,309 | B2 | 9/2015 | Geiger |
| 9,209,730 | B2 | 12/2015 | Scipio et al. |
| 2006/0010876 | A1* | 1/2006 | Hoffmann ............... F02C 7/057 60/773 |
| 2012/0067055 | A1 | 3/2012 | Held |
| 2015/0168927 | A1 | 6/2015 | Jordan, Jr. et al. |
| 2017/0016395 | A1 | 1/2017 | Kim et al. |
| 2017/0051681 | A1* | 2/2017 | Arias Chao ............ F01K 13/02 |

FOREIGN PATENT DOCUMENTS

| EP | 3087268 A1 | 11/2016 |
|---|---|---|
| WO | 2017122468 A1 | 7/2017 |

* cited by examiner

*Primary Examiner* — Scott J Walthour
(74) *Attorney, Agent, or Firm* — Armstrong Teasdale LLP

(57) ABSTRACT

A turbine system includes a compressor section, an inlet cooling system coupled upstream of the compressor section and configured to cool ambient air entering the compressor section, and a turbine section coupled in flow communication with the compressor section and including at least one hot gas path component. The system further includes a controller configured to receive feedback parameters indicative of a temperature of the at least one hot gas path component, estimate a remaining life of the at least one hot gas path component based on the received feedback parameters, determine a desired power output of the turbine system based on the estimated remaining life of the at least one hot gas path component and a cooling capacity of the inlet cooling system, and control operation of the turbine system to cause the turbine system to generate the desired power output.

19 Claims, 7 Drawing Sheets

SYSTEMS AND METHODS FOR OPERATING A TURBINE ENGINE

BACKGROUND

The field of the disclosure relates generally to turbine engines and, more specifically, to turbine engines for use in a combined cycle power plant including one or more gas turbines and one or more steam turbines. In particular, the field of disclosure includes systems and methods for operating a turbine engine to improve at least one of longevity of hot gas path components within turbine engines and power output of the combined cycle power plant.

In at least some known rotary machines, energy is extracted from a gas stream in a turbine which powers a mechanical load. During operation of the rotary machine, various hot gas path components are subjected to the high-temperature gas stream, which can induce wear in the hot gas path components. For example, air is pressurized in a compressor and mixed with fuel in a combustor for generating the stream of high-temperature gases. Generally, higher temperature gases increase performance, efficiency, and power output of the turbine engine. However, higher temperature gases can also increase thermal stresses and/or thermal degradation of the turbine engine components.

Further, at least some known hot gas path components are subject to damage resulting from thermal gradients resulting from rapid temperature changes of hot gas components during operation of the turbine engine. For example, startups and shutdowns generally tend to produce gas and metal temperature changes in a turbine engine that have the potential to produce thermal gradients within the hot gas path components. These gradients can produce thermal stresses that can eventually lead to deterioration of the hot gas path components.

BRIEF DESCRIPTION

In one aspect, a turbine system is provided. The turbine system includes a compressor section, an inlet cooling system coupled upstream of the compressor section and configured to cool ambient air entering the compressor section, and a turbine section coupled in flow communication with the compressor section and including at least one hot gas path component. The system further includes a controller configured to receive feedback parameters indicative of a temperature of the at least one hot gas path component, estimate a remaining life of the at least one hot gas path component based on the received feedback parameters, determine a desired power output of the turbine system based on the estimated remaining life of the at least one hot gas path component and a cooling capacity of the inlet cooling system, and control operation of the turbine system to cause the turbine system to generate the desired power output.

In another aspect, a turbine system is provided. The turbine system includes a compressor section, a combustor section coupled downstream from the compressor section, a turbine section coupled downstream from the combustor section, and a bypass line extending between the compressor section and the turbine section. The bypass line is configured to provide compressed air from the compressor section to the turbine section. The turbine system further includes a thermal regulation system coupled to the bypass line. The thermal regulation system is controllable to affect the temperature of the compressed air provided by the bypass line to the turbine section.

In yet another aspect, a method of operating a turbine system is provided. The turbine system having a compressor section, an inlet cooling system coupled upstream of the compressor section and configured to cool ambient air entering the compressor section, and a turbine section coupled in flow communication with the compressor section and including at least one hot gas path component. The method includes receiving, at a controller coupled to the inlet cooling system, feedback parameters indicative of a temperature of the at least one hot gas path component. The method further includes estimating, using the controller, a remaining life of the at least one hot gas path component based on the received feedback parameters and determining, using the controller, a desired power output of the turbine system. The desired power output is determined based on the estimated remaining life of the at least one hot gas path component and a cooling capacity of the inlet cooling system. The method also includes controlling, using the controller, operations of the turbine system to cause the turbine system to generate the desired power output

DRAWINGS

These and other features, aspects, and advantages of the present disclosure will become better understood when the following detailed description is read with reference to the accompanying drawings in which like characters represent like parts throughout the drawings, wherein.

Figure 1:
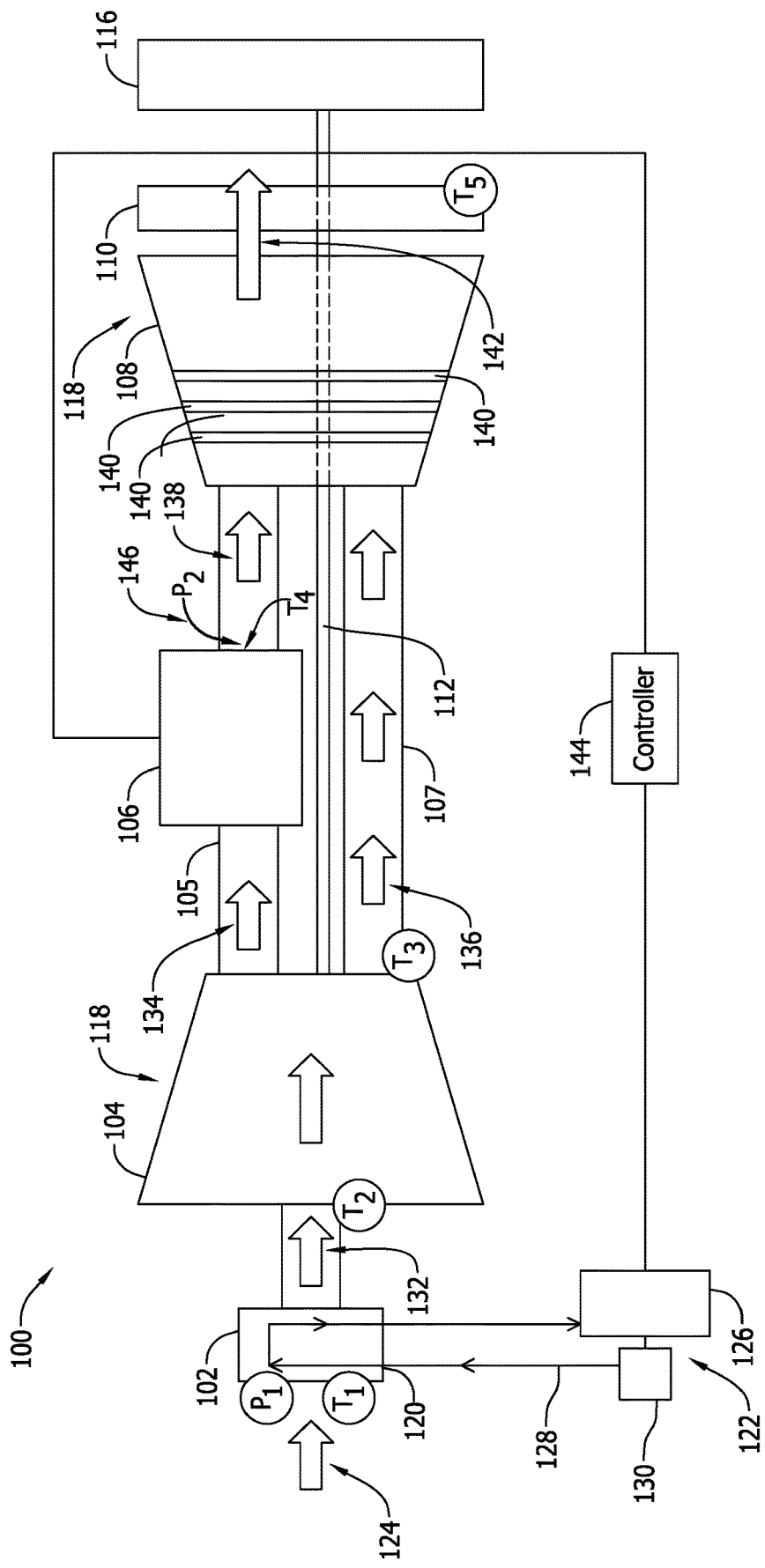
FIG. 1 is a schematic view of an exemplary turbine system.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

As used herein, the term "upstream" refers to a forward or inlet end of a turbine engine, and the term "downstream" refers to an aft or exhaust end of the turbine engine.

Embodiments described herein relate to turbine systems and to methods for controlling turbine systems. The system includes a compressor section, an inlet cooling system coupled upstream of the compressor section and configured to cool ambient air entering the compressor section, and a turbine section coupled in flow communication with the compressor section and including at least one hot gas path component. The system further includes a controller configured to receive feedback parameters indicative of a temperature of the at least one hot gas path component, estimate a remaining life of the at least one hot gas path component based on the received feedback parameters, determine a desired power output of the turbine system based on the estimated remaining life of the at least one hot gas path component and a cooling capacity of the inlet cooling system, and control operation of the turbine system to cause the turbine system to generate the desired power output. As a result, the turbine systems and methods described herein reduce the damage to at least one hot gas path components by providing cooling from the inlet cooling system to the at least one hot gas path components during operation. In addition, the turbine systems and methods described herein also allow for improved operation of the turbine system by taking into account the tradeoffs between increased power output and the resulting deteriorative effects to the at least one hot gas path components.

In some embodiments, the turbine system includes a bypass line extending between the compressor section and the turbine section. The bypass line is configured to provide compressed air from the compressor section to the turbine section. The turbine system also includes a thermal regulation system coupled to the bypass line that is controllable to affect the temperature of the compressed air provided by the bypass line to the turbine section. As a result, the turbine systems and methods described herein reduce the deteriorative effects of sharp temperature changes in the turbine section, for example, during a start-up or shutdown of the turbine system, on hot gas path components.

FIG. 1 is a schematic view of an exemplary turbine system 100, i.e., a turbomachine, and more specifically a turbine engine. In the exemplary embodiment, turbine system 100 is a gas turbine engine. Alternatively, turbine system 100 may be any other turbine engine and/or rotary machine, including, without limitation, a steam turbine engine, a gas turbofan aircraft engine, other aircraft engine, a wind turbine, a compressor, and a pump. In the exemplary embodiment, turbine system 100 includes an intake section 102, a compressor section 104 that is coupled downstream from intake section 102, a combustor section 106 that is coupled downstream from compressor section 104 via a combustor line 105, a turbine section 108 that is coupled downstream from combustor section 106 via combustor line 105 and is coupled downstream from compressor section 104 via a bypass line 107, and an exhaust section 110 that is coupled downstream from turbine section 108. Turbine section 108 is coupled to compressor section 104 via a rotor shaft 112. It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a single combustor. In alternative embodiments, combustor section 106 includes a plurality of combustors (not shown) coupled to compressor section 104 such that each combustor is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

In the exemplary embodiment, intake section 102 includes an inlet housing 120 and an inlet cooling system 122. Intake section 102 is coupled upstream of compressor section 104 and is configured to cool ambient air 124 entering compressor section 104. In the exemplary embodiment, inlet cooling system 122 includes a chiller 126, a cooling pipe 128, and a coolant pump 130. Chiller 126 is configured to store and chill a coolant to a temperature below the temperature of ambient air 124. Coolant pump 130 is operable to drive the coolant from chiller 126 through cooling pipe 128 and through inlet housing 120 such that heat from ambient air 124 directed into inlet housing 120 is absorbed by the coolant circulating through cooling pipe 128, thereby cooling ambient air 124. In the exemplary embodiment, the coolant leaving chiller 126 is approximately 50 degrees Fahrenheit and the coolant returning to chiller 126 from inlet housing 120 is approximately 55 degrees Fahrenheit. In alternative embodiments, coolant is any temperature that enables inlet cooling system 122 to function as described herein. As a result of being cooled by inlet cooling system 122, inlet air 132 exiting inlet housing 120 is also denser than ambient air 124. Accordingly, inlet cooling system 122 facilitates providing more air to turbine system 100 during operation and results in greater power produced by turbine system 100. In alternative embodiments, inlet cooling system 122 includes an evaporative cooling media (not shown) coupled upstream of compressor section 104 and a pump (not shown) connected to the cooling media through a line. In such embodiments, as air flows by the cooling media, some of the water in the cooling media evaporates. The evaporation of water in the cooling media absorbs heat from the air and thus reduces the temperature of the air. In further alternative embodiments, inlet cooling system 122 includes an inlet fogging system (not shown). In yet further alternative embodiments, inlet cooling system 122 includes any cooling system that enables turbine system 100 to operate as described herein.

In the exemplary embodiment, inlet cooling system 122 is controllable, via operation of chiller 126 and coolant pump 130, to cool the temperature of inlet air 132 to any temperature differential with respect to ambient air 124 up to a maximum cooling capacity of inlet cooling system 122. In alternative embodiments, inlet cooling system 122 has any maximum cooling capacity that enables turbine system 100 to operate as described herein.

In operation, intake section 102 channels inlet air 132 towards compressor section 104. Compressor section 104 compresses inlet air 132 to higher pressures prior to discharging compressed air 134, 136 towards combustor section 106. A first portion of compressed air 134 is channeled to combustor section 106 where it is mixed with fuel (not shown) and burned to generate high temperature combustion gases 138. A second portion of compressed air 136 bypasses combustor section 106 and is channeled to turbine section 108. Combustion gases 138 are channeled downstream towards turbine section 108 and impinge upon hot gas path components 140. Often, combustor section 106 and turbine section 108 are referred to as a hot gas path ("HGP") of turbine system 100. Accordingly, as used herein, the term "hot gas path components" refers to any components of turbine system 100 located within combustor section 106 or turbine section 108 and in flow communication with combustion gases 138. For example, in the exemplary embodiment, HGP components 140 include combustor liners, nozzles, vanes, and buckets associated with turbine blades for converting thermal energy to mechanical rotational energy that is used to drive rotor assembly 118. In alternative embodiments, HGP components 140 include any components that enable turbine system 100 to function as described herein. In the exemplary embodiment, second portion of compressed air 136 is channeled through bypass line 107 to cool HGP components 140 and rejoin combustion gases 138 in turbine section 108. Exhaust gases 142 then discharge through exhaust section 110 to ambient atmosphere.

Figure 2:
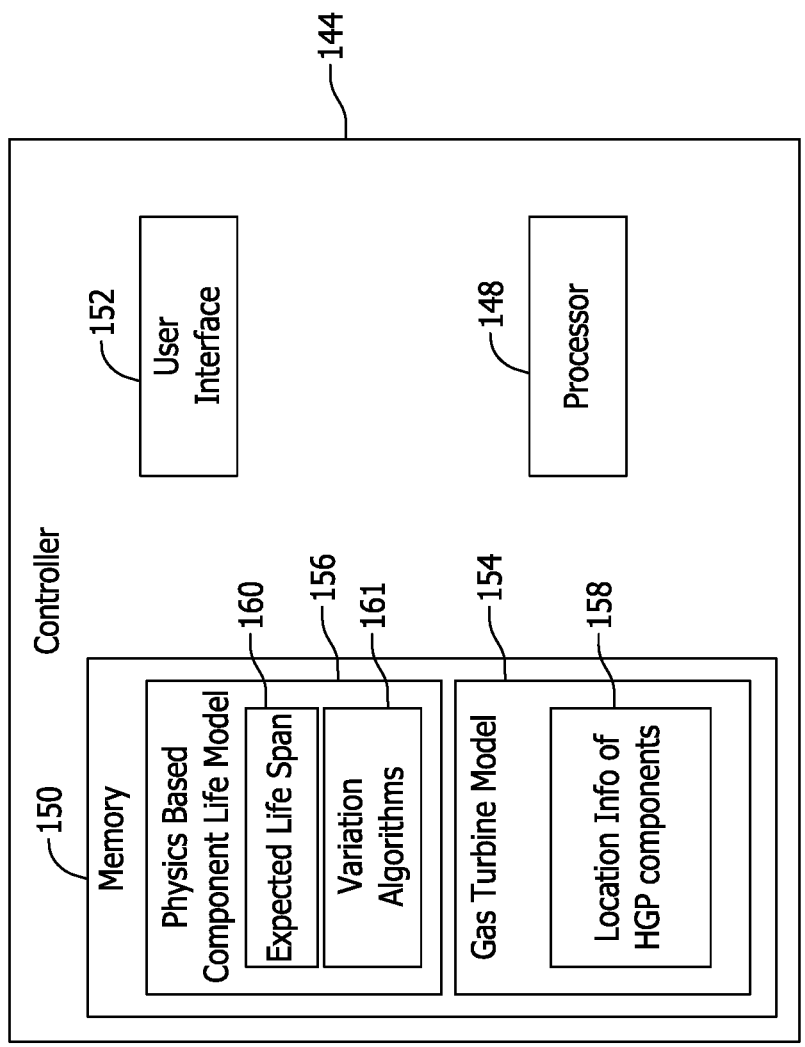
FIG. 2 is a block diagram of an exemplary controller for use with the turbine system of FIG. 1.
Figure 3:
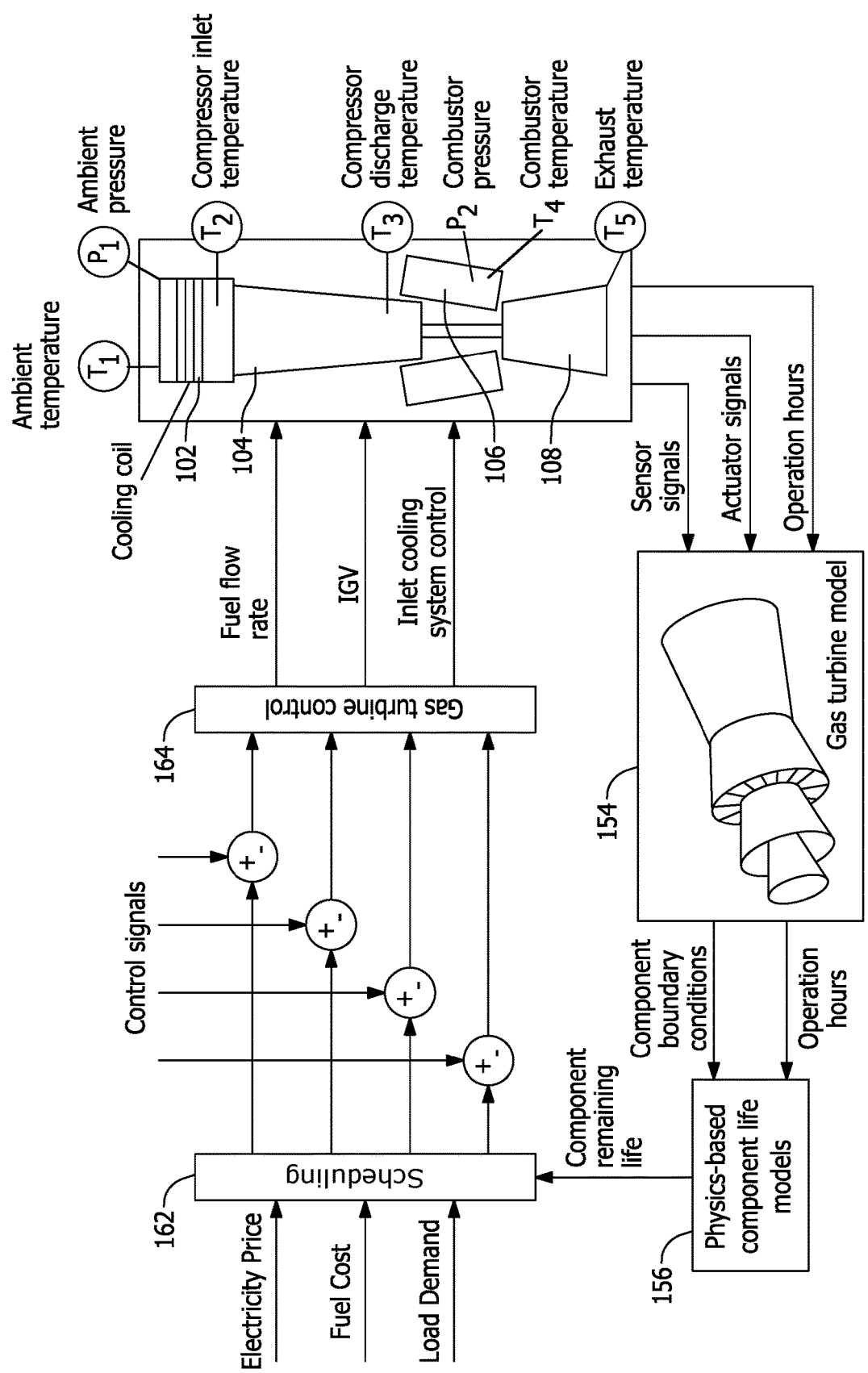
FIG. 3 is a data flow diagram for operation of the turbine system of FIG. 1.

In the exemplary embodiment, as described in greater detail with respect to FIGS. 2 and 3, turbine system 100 includes a controller 144 communicatively coupled to inlet cooling system 122 and combustor section 106. Controller 144 is configured to control components of turbine system 100 such that turbine system 100 generates a desired power output. In the exemplary embodiment, controller 144 is configured to control power output of turbine system 100 by controlling fuel injection in combustor section 106. In alternative embodiments, turbine system 100 includes an inlet guide vane (not shown) communicatively coupled to controller 144. In such embodiments, controller 144 also controls power output of turbine system 100 by controlling adjustment of the inlet guide vane.

In the exemplary embodiment, turbine system 100 further includes temperature sensors $T_1$-$T_3$, $T_5$ and pressure sensor $P_1$ communicatively coupled to controller 144. In particular, in the exemplary embodiment, intake section 102 includes temperature sensor $T_1$ and pressure sensor $P_1$ configured to detect respectively the temperature and pressure of ambient air 124. In the exemplary embodiment, temperature sensor $T_1$ is a dry-bulb temperature sensor. In alternative embodiments, intake section 102 includes a wet-bulb temperature sensor and a dry-bulb temperature sensor. Intake section 102 further includes temperature sensor $T_2$ configured to detect the temperature of inlet air 132 exiting inlet housing 120. Compressor section 104 includes a temperature sensor $T_3$ configured to detect the temperature of air discharged from compressor section 104. More specifically, in the exemplary embodiment, temperature sensor $T_3$ is configured to detect the temperature of second portion of compressed air 136. Exhaust section 110 includes temperature sensor $T_5$ configured to detect the temperature of air discharged from turbine section 108.

In the exemplary embodiment, combustor section 106 expels air at a temperature indicated at $T_4$ and at a pressure indicated at $P_2$. In particular, in the exemplary embodiment $T_4$ and $P_2$ are determined based on the temperature sensed by temperature sensor $T_3$ and by at least one operation characteristic of combustor section 106. In the exemplary embodiment, the at least one operation characteristic of combustor section 106 is the fuel to air ratio of the combustor section 106. In alternative embodiments, the at least one operation characteristic of combustor section 106 includes any operation characteristic of combustor section 106 that enables turbine system 100 to function as described herein. In alternative embodiments, $T_4$ and $P_2$ are determined by a respective temperature sensor and pressure sensor (not shown) coupled at an exit 146 of combustor section 106 and configured to detect respectively the temperature and pressure of combustion gases 138 discharged from combustion section 106. In alternative embodiments, turbine system 100 includes any number and placement of temperature sensors and pressure sensors that enable turbine system 100 to function as described herein. For example, and not by way of limitation, in alternative embodiments, at least one of HGP components 140 includes a temperature sensor (not shown) coupled thereto. In yet further alternative embodiments, turbine system 100 does not include any temperature sensors or pressure sensors.

In the exemplary embodiment turbine system 100 is configured for operation at a base-load. In particular, base-load operation of turbine system 100, or more broadly, standard operation of turbine system 100, is associated with a firing temperature of combustor section 106 (i.e., a resulting temperature at exit 146 of combustor section 106). That is, HGP components 140 are configured to withstand base-load operation of turbine system 100 for a maximum recommended maintenance interval, after which, HGP components 140 face a higher probability of failure. In the exemplary embodiment, turbine system 100 is further configured for over-firing operation. As used herein, "over-firing" refers to operating turbine system 100 such that the firing temperature at exit 146 of combustor section 106 is increased to a temperature higher than the temperature associated with base-load operation.

In the exemplary embodiment, operation of inlet cooling system 122 results in a reduced temperature of first portion of compressed air 134 and second portion of compressed air 136. Because second portion of compressed air 136 bypasses combustor section 106 and flows to turbine section 108, reduction in the temperature of second portion of compressed air 136 causes cooling of HGP components 140. As a result, operation of inlet cooling system 122 allows for reduced temperatures of HGP components 140, and thereby longer life expectancies of HGP components 140, for any given operating load of turbine system 100 (i.e., for any given firing temperature at exit 146 of combustor section 106). For example, operation of inlet cooling system 122 may be controlled to extend the expected life spans of HGP components 140 by operating turbine system 100 at a base-load with inlet cooling system 122. In contrast, turbine system 100 may be over-fired without significantly increasing damage to HGP components 140.

Table 1 shows results achieved through modeling operations of turbine system 100 within a combined cycle (CC) power plant, according to the following exemplary parameters. In each of the Examples, ambient air 124 temperature was at 90 degrees Fahrenheit. In Example 1, inlet cooling system 122 was not actuated and turbine system 100 was operated at base-load. In Example 1 the temperature sensed at $T_2$ was equal to the ambient temperature sensed at $T_1$. In Example 2, inlet cooling system 122 was actuated and turbine system 100 was operated at base-load. In particular, in Example 2 with inlet cooling system 122 actuated, the temperature $T_4$ at exit 146 of combustor section 106 was Y° F. As shown in Example 2, operation of inlet cooling system 122 reduced the temperature sensed at the compressor section inlet $T_2$ by 31° F. The temperature sensed at the compressor section 104 outlet at $T_3$ was decreased by 35° F. compared with Example 1, thereby increasing the cooling of HGP components 140. The reduction in temperature of HGP components 140 results in increased life spans for HGP components 140. In particular, as shown in Example 2 below, the life use factor of HGP components 140 was reduced from 1.28 to 0.95.

In Example 3, turbine system 100 was operated in a "Capacity Mode" to increase the total CC power output while maintaining the life use factor of HGP components 140 at approximately the life use factor of Example 1, where turbine system 100 was operated without inlet cooling system 122 actuated. More specifically, in Example 3, inlet cooling system 122 was actuated and turbine system 100 was operated at 20° F. over-firing. In other words, in Example 3, turbine system 100 was operated such that the temperature $T_4$ was 20° F. greater than the temperature at $T_4$ during base-load operation (i.e., Example 2). Example 3 resulted in significant power output increases with respect to Example 2 (e.g., 1.3%) with minimal differences to the temperature of HGP components 140 due to added cooling provided by inlet cooling system 122.

In Example 4, turbine system 100 was operated in an "Efficiency Mode" to increase net CC efficiency (i.e., increase the heat rate of turbine system 100) while the CC power output was held fixed at the value of Example 2 (e.g., 288.4 MW). More specifically, in Example 4, inlet cooling system 122 was actuated, the angle of inlet guide vanes was reduced by 5 degrees with respect to Examples 1-3, and turbine system 100 was operated at 26° F. over-firing. As a result, the temperature of HGP components 140, and by extension the life use factor of HGP components 140, were maintained at approximately the life use factor of Example 1, where turbine system 100 was operated without inlet cooling system 122 actuated, and Example 3, where turbine system 100 was operated in "Capacity Mode". Additionally, net CC Efficiency was increased to 56.13%, representing a gain of approximately 0.28% over Example 2, where turbine system 100 in was operated in "Conventional Operation" and a gain of approximately 0.09% over Example 3 where turbine system 100 was operated in "Capacity Mode."

TABLE 1

| Description | Example 1 | Example 2 | Example 3 | Example 4 |
|---|---|---|---|---|
|  | No inlet cooling | Conventional operation | Capacity Mode | Efficiency Mode |
| $T_1$, F. | 90 | 90 | 90 | 90 |
| $T_2$, F. | 90 | 59 | 59 | 59 |
| $T_3$, F. | X | X − 35 | X − 35 | X − 45 |
| $T_4$, F. | Y | Y | Y + 20 | Y + 26 |
| IGV, Degrees | Z | Z | Z | Z − 5 |
| HGP Life use Factor | 1.28 | 0.95 | 1.28 | 1.28 |
| Net CC Power, MW | 263.4 | 288.4 | 292.2 | 288.4 |
| Net CC Efficiency, % | 55.87 | 55.97 | 56.08 | 56.13 |

The above examples described in Table 1 represent modeled operations of turbine system 100 within a combined cycle (CC) power plant. More specifically, the above described example operations detail the manner in which varying controls of turbine system 100, such as, for example, the firing temperature, inlet cooling system 122, and control of inlet guide vanes, may produce different outcomes with respect to power production, efficiency, and lifespan of HGP components 140. In alternative embodiments, firing temperature, inlet guide vane control, and inlet cooling system 122 are controlled in any manner that enables turbine system 100 to function as described herein. For example, as described in greater detail below, turbine system 100 may be controlled such that the resulting power production, efficiency, and lifespan of HGP components 140 are optimized with respect to varying conditions and financial considerations such as, for example, fuel price, remaining HGP component lifespan, and load demand of turbine system 100.

FIG. 2 is a block diagram of exemplary controller 144 of turbine system 100, shown in FIG. 1. FIG. 3 is a data flow diagram for operation of turbine system 100. In the exemplary embodiment, controller 144 includes a processor 148, a memory 150, and a user interface 152. User interface 152 facilitates controller 144 receiving at least one user-input parameter. In alternative embodiments, controller 144 does not include user interface 152. For example, in some such embodiments, turbine system 100 is coupled in communication with a control and optimization component (not shown) operable to calculate and determine operating settings of turbine system 100 based on higher-level optimization objectives without receiving a user-input parameter.

In the exemplary embodiment, memory 150 includes a Gas Turbine Model 154 and a Physics Based Component Life Model 156. Gas Turbine Model 154 includes stored data relating to HGP components 140. In particular, in the exemplary embodiment, Gas Turbine Model 154 includes location information 158 of hot gas path components relative to temperature sensors $T_1$-$T_5$ and pressure sensors $P_1$, $P_2$. In the exemplary embodiment, as shown in FIG. 3, Gas Turbine Model 154 receives feedback parameters from turbine system 100. In particular, in the exemplary embodiment, the feedback parameters include signals received from temperature sensors $T_1$-$T_5$, pressure sensors $P_1$, $P_2$, actuator signals (e.g., signals indicative of whether combustor section 106, inlet cooling system 122, or other portions of turbine system 100 are actuated), and operating hours of turbine system 100. Gas Turbine Model 154 then determines boundary conditions of each HGP component 140 based on the received feedback parameters and location information 158. In alternative embodiments, Gas Turbine Model 154 receives any feedback parameters that enables turbine system 100 to function as described herein. In further alternative embodiments, memory 150 includes any model that enables turbine system 100 to function as described herein. For example, in alternative embodiments, memory 150 includes a non-physics based component life model.

In the exemplary embodiment, Physics Based Component Life Model 156 includes predefined expected life span data 160 of HGP components 140 based on a standard operating temperature. In particular, the standard operating temperatures are the temperatures HGP components 140 are exposed to during operation at base-load. Further, in the exemplary embodiment, Physics Based Component Life Model 156 includes variation algorithms 161 defining relationships for each of HGP components 140 regarding the effect of variation from base-load operation on life expectancy/service intervals of each of HGP components 140. Accordingly, as shown in FIG. 3, Physics Based Component Life Model 156 is configured to determine remaining life for HGP components 140 based on the histories of the boundary conditions of each HGP component 140. In the exemplary embodiment, the histories of the boundary conditions of each HGP component 140 include numbers of planned and unplanned shutdowns/startups and accumulated times at various temperatures for each HGP component 140. The temperature at a given time for each HGP component 140 is determined based on Physics Based Component Life Model 156 with the sensor/actuator signals as inputs. The histories are stored in memory 150 from the beginning of operation. The histories allow Physics Based Component Life Model 156 to calculate the remaining life for each HGP component 140. After an HGP component 140 is replaced or repaired, the remaining life for that specific HGP component 140 is reset or modified. In alternative embodiments, controller 144 is further configured to consider fuel type used with turbine system 100 to determine the life expectancy/service intervals of each of HGP components 140 associated with operating at a given firing temperature. For example, in the exemplary embodiment, turbine system 100 is operated using natural gas as fuel. However, turbine system 100 is also configured to be fueled by lower hydrogen content fuels (e.g., distillates and residual oils) containing higher concentration of corrosive elements. The use of such fuels can reduce the life expectancy and/or recommended service intervals of HGP components 140. Accordingly, in such alternative embodiments, controller 144 is configured to receive data relating to fuel type from, for example and not by way of limitation, a user-input and/or a fuel sensor (not shown), and determine estimates of remaining life expectancy/service intervals of HGP components 140 based, at least in part, on the received fuel type data. In yet further alternative embodiments, controller 144 is configured to consider any parameter related to life expectancy/service intervals of HGP components 140 that enables turbine system 100 to operate as described herein.

In the exemplary embodiment, controller 144 further includes a scheduling block 162 to facilitate optimization of turbine system 100 operation with respect to optimization parameters received at scheduling block 162. For example, scheduling block 162 receives remaining life data for HGP components 140 determined at Physics-Based Component Life Models 156 as an optimization parameter. In the exemplary embodiment, scheduling block 162 also receives data related to load demand, fuel cost, and electricity price as optimization parameters. Scheduling block 162 is configured to generate control signals for turbine system 100 at successive time steps, based on the received data, such that controller 144 facilitates operating turbine system 100 at a minimized cost with respect to the optimization parameters.

More specifically, each of optimization parameters includes either a cost or benefit associated with the optimization parameter. In determining an optimal firing temperature of combustor section 106, controller 144 considers whether there is a net benefit to the optimization parameters associated with marginal changes to control operations of turbine system 100. For example, an increase in the electricity price parameter represents a positive benefit with respect to operating turbine system 100 to increase generated power output. In contrast, an increase in fuel price represents a cost with respect to operating turbine system 100 to increase firing temperature (i.e., increased fuel consumption). In such situations, when output power level still needs to be kept at baseload, an efficiency mode can be enabled whereby firing temperature is increased and inlet guide vanes (not shown) are closed to maintain output power while reducing the heat rate (e.g., increasing the fuel efficiency) of turbine system 100. Further, the load demand parameter includes an associated cost (i.e., cost of purchasing electricity from other power generation sources to supplement difference between load demand and power output) if a total power output of turbine system 100 is less than the load demand parameter.

In addition, remaining life data includes a cost associated with a reduced life expectancy/service intervals of HGP components 140 resulting from operating turbine system 100 at higher firing temperatures, or, more specifically, at higher estimated temperatures of HGP components 140. In the exemplary embodiment, the cost associated with reduced life expectancy/service intervals of HGP components 140 is based on a combination of costs associated with increased servicing of HGP components 140 and costs of replacing HGP components 140. For example, operation of HGP components 140 at over-firing temperatures for a marginal increment of time (e.g., an hour) has a relatively marginal effect on the average total life expectancy of HGP components 140 and a relatively marginal effect on the average expected frequency of service intervals over the lifetime of HGP components 140. In the exemplary embodiment, controller 144 is configured to calculate the marginal effects on total life expectancy and frequency of service intervals expected to result from changes to operation of turbine system 100, and associate these marginal effects with representative costs (e.g., cost of replacing HGP component 140 for marginal changes to life expectancy and costs of shutdowns and repairs associated with increased service intervals over the lifetime of HGP components 140). In alternative embodiments, costs of marginal effects to life expectancy/service intervals of HGP components 140 are based on costs associated with HGP component 140 most susceptible to failure. For example, in such embodiments, costs associated with deterioration to HGP components 140 will be high if all components have a near full remaining life span but one HGP component 140 is at the very end of its life span. In yet further alternative embodiments, costs are associated with marginal changes to the life expectancy/service intervals of HGP components 140 in any manner that enables turbine system 100 to function as described herein.

Additionally, controller 144 is configured to control turbine system 100 at Gas Turbine Control Block 164 (shown in FIG. 3) by different control operations. In the exemplary embodiment, the control operations include modulating the flow rate of fuel in combustor section 106, adjusting the positioning of inlet guide vanes (not shown), controlling inlet cooling system 122 (e.g., actuation of inlet cooling system 122 or adjusting flow rate at coolant pump 130 or power to chiller 126), and controlling the compressor inlet temperature. For example, when the compressor inlet temperature is higher than a desired value, controller 144 increases the power to chiller 126, resulting in a reduced temperature of the coolant leaving chiller 126. The reduced coolant temperature allows the coolant to absorb more heat from inlet air 132 through cooling pipe 128, resulting in a reduced compressor inlet temperature. Alternatively, or in addition to increasing power to chiller 126, controller 144 also increases the speed of coolant pump 130 to efficiently move heat from inlet air 132 to the coolant through cooling pipe 128 and to chiller 126. In alternative embodiments controller 144 is configured to control turbine system 100 by any means that enables turbine system 100 to function as described herein.

In the exemplary embodiment, controller 144 determines the value of the optimization parameters and associated costs for every possible combination of flow rate of fuel in combustor section 106, inlet guide vane position, and operation of inlet cooling system 122, to determine control signals that will produce the optimal benefit. For example, as described above with respect to FIG. 1, turbine system 100 may be over-fired or operated at a base-load, with inlet cooling system 122 actuated. Particularly, turbine system 100 may be operated at base-load with inlet cooling system 122 to extend life expectancy/service intervals of HGP components 140 or turbine system 100 may be over-fired, resulting in a greater power output but reduced life expectancy/service intervals of HGP components 140 compared with base-load operation. Thus, when electricity prices are sufficiently high, it may be cost beneficial to over-fire turbine system 100 as long as the benefit in increased revenue from generated electricity exceeds fuel costs and costs resulting from greater deterioration of HGP components 140. Conversely, when electricity costs are low, base-load operation of turbine system 100 in "Efficiency Mode", as described above with respect to Table 1, may be cost beneficial.

Figure 4:
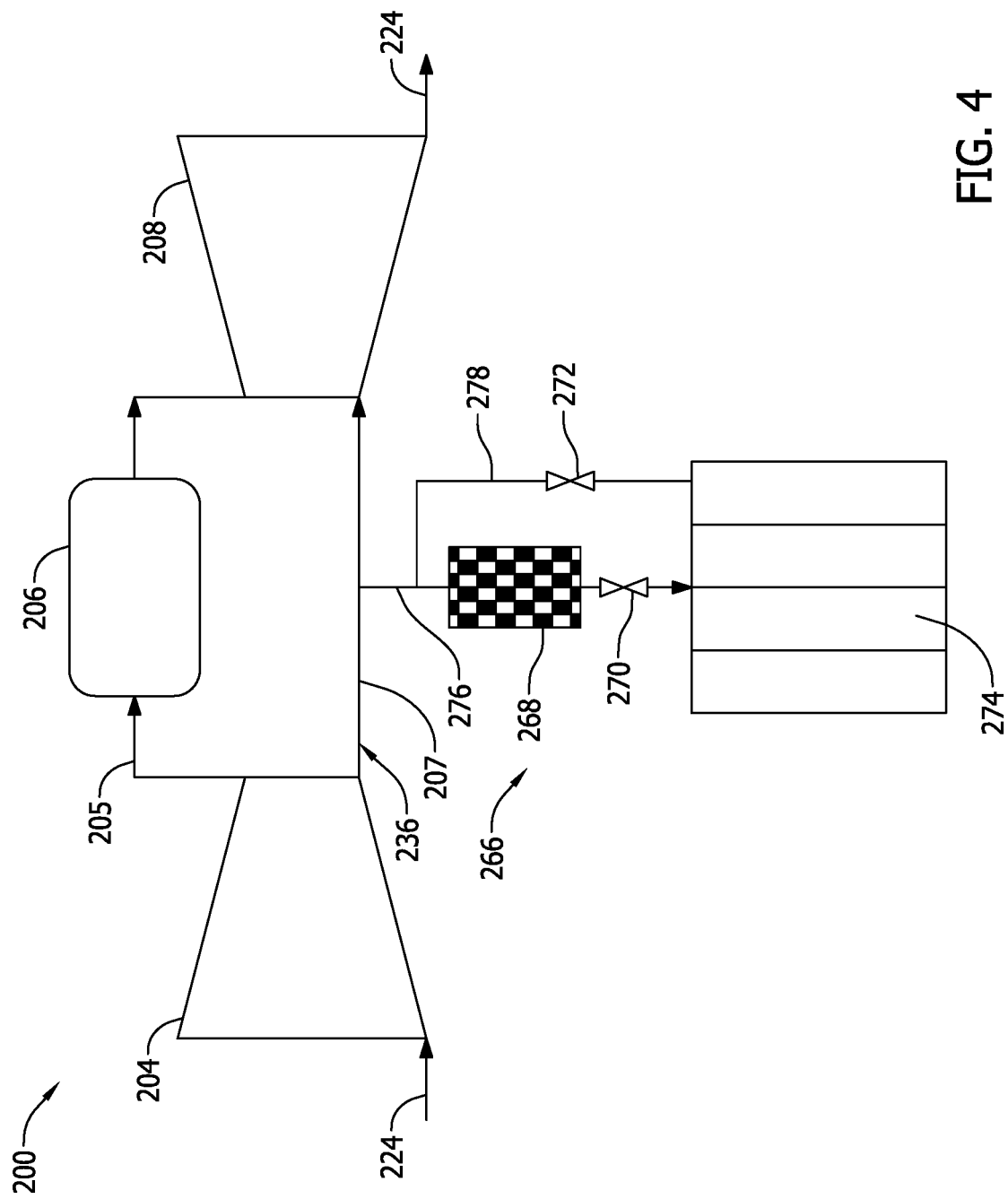
FIG. 4 is a schematic view of an alternative turbine system including a thermal regulation system and operating in a steady state.
Figure 5:
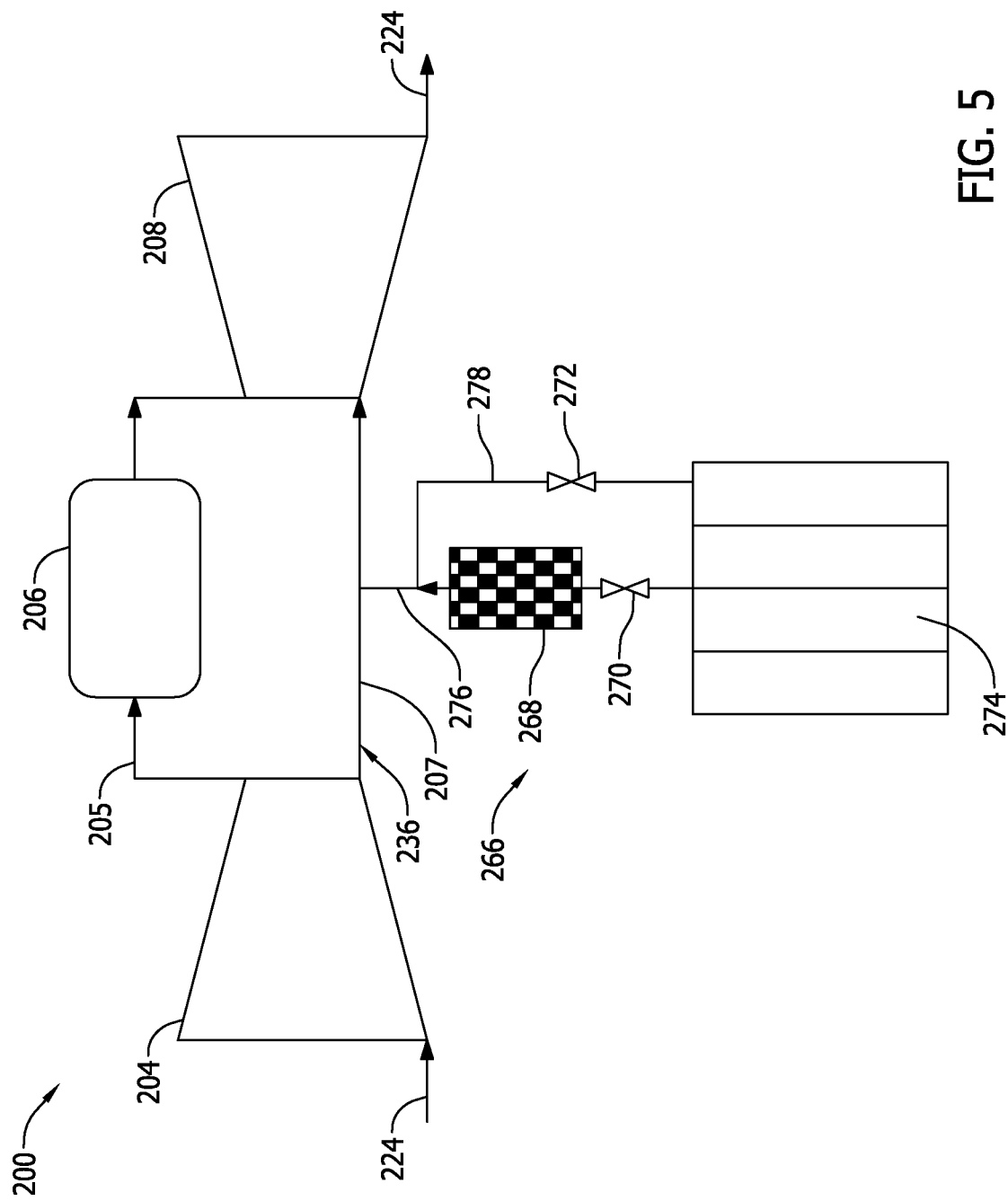
FIG. 5 is a schematic view of the turbine system of FIG. 4 during a startup operation.
Figure 6:
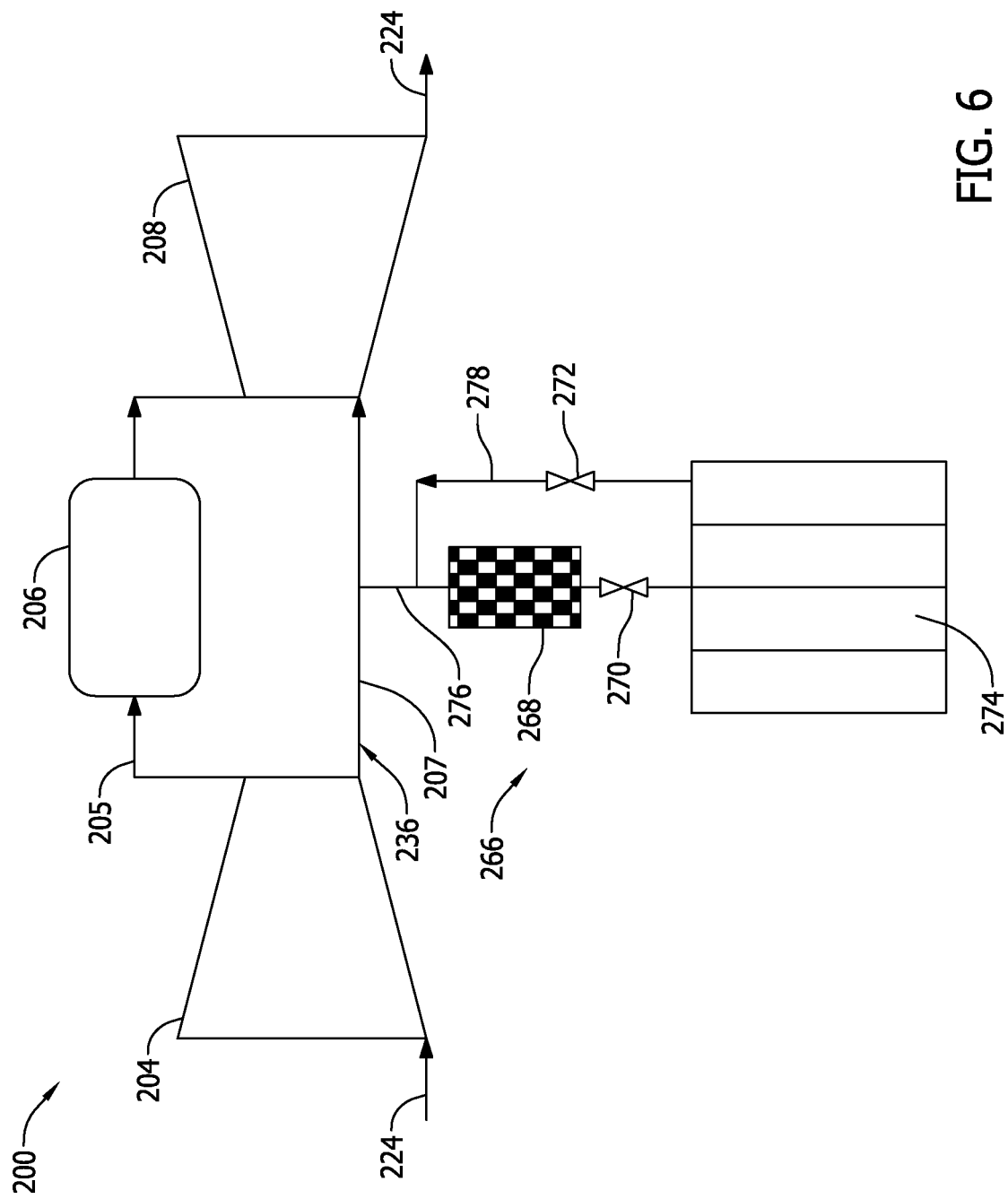
FIG. 6 is a schematic view of the turbine system of FIG. 4 during a shutdown operation.

FIG. 4 is a schematic view of an alternative turbine system 200 including a thermal regulation system 266 and operating in a steady state. FIG. 5 is a schematic view of turbine system 200 of FIG. 4 during a startup operation. FIG. 6 is a schematic view of turbine system 200 of FIG. 4 during a shutdown operation. Turbine system 200 is substantially similar to turbine system 100 described above with respect to FIG. 1 except as described below. Accordingly, in the exemplary embodiment, turbine system 200 includes a compressor section 204, a combustor section 206 that is coupled downstream from compressor section 204 via a combustor line 205, a turbine section 208 that is coupled downstream from combustor section 206 via combustor line 205 and is coupled downstream from compressor section 204 via a bypass line 207. Thermal regulation system 266 includes a thermal storage device 268, a first control valve 270, a second control valve 272, compressed air storage 274, a first regulation line 276 and a second regulation line 278.

In the exemplary embodiment, bypass line 207 intersects with first regulation line 276 at a T intersection. First regulation line 276 extends through thermal storage device 268 to first control valve 270 and continues to compressed air storage 274. Thermal storage device 268 is configured to absorb heat from air in first regulation line 276 passing through thermal storage device 268. In the exemplary embodiment, thermal storage device 268 is a packed bed. In alternative embodiments, thermal storage device 268 is any suitable thermal storage device that enables turbine system 200 to operate as described herein. Second regulation line 278 extends between compressed air storage 274 and a portion of first regulation line 276 between thermal storage device 268 and bypass line 207. In the exemplary embodiment, first control valve 270 and second control valve 272 are each adjustable control valves operable to control the flow rate through each respective valve.

During steady state operation, first control valve 270 is opened and second control valve 272 is closed. As ambient air flows into compressor section 204, at least some of a second portion of compressed air 236 flowing through bypass line 207 flows into first regulation line 276 and to thermal storage device 268. As the air passes thermal storage device 268, heat is transferred from the compressed air to thermal storage device 268. As a result, thermal storage device 268 is heated and the air leaving thermal storage device 268 and passing to first control valve 270 is cooled. Since the first control valve 270 is opened, the compressed air is allowed to pass through first control valve 270 and into compressed air storage 274. The compressed air is stored in compressed air storage 274 and inhibited from exiting through second regulation line 278 because second control valve 272 is closed.

Referring to FIG. 5, during a startup operation of turbine system 200, first control valve 270 and second control valve 272 are modulated such that warmed compressed air flows from thermal regulation system 266 at a desired rate. In particular, in the exemplary embodiment, first control valve 270 is fully opened and second control valve 272 is closed. As a result, the air in compressed air storage 274 entirely flows through first regulation line 276 through first control valve 270 to thermal storage device 268 to bypass line 207 and is channeled to turbine section 208. The air flowing from compressed air storage 274 to thermal storage device 268 is warmed by thermal storage device 268. More specifically, the more air that is directed from compressed air storage 274 through first control valve 270, as opposed to second control valve 272, the warmer the resulting cooling air flowing through bypass line 207 and into turbine section 208 will be. Accordingly, modulation of first and second control valves 270, 272 allows for controlling the temperature of the cooling air directed to turbine section 208.

During operation of turbine system 200, changes in operation (i.e., start-up and shutdown operations) can produce rapid changes in temperature in turbine section 208, and as a result, rapid changes in temperature of HGP components 140 (shown in FIG. 1). These temperature changes may produce thermal gradients across HGP components 140. For example, some HGP components 140 (e.g., an airfoil) have varying thickness along the lengths of HGP components 140. During rapid changes in gas temperature, the thinner sections of HGP components 140 heat or cool more quickly than the thicker sections, producing thermal gradients across HGP components 140. These thermal gradients, in turn, may produce thermal stresses that can eventually lead to deterioration of HGP components 140. As a result, modulating the temperature of the cooling air directed to turbine section 208 through bypass line 207 allows for reducing the rapid temperature changes that may occur during operation of turbine system 200, and thereby reduces thermal gradients across HGP components 140. For example, during startup, directing warmer cooling air to turbine section 208 allows for a more gradual heating of HGP components 140. Conversely, directing cooler cooling air during a shutdown allows for a more gradual cooling of HGP components 140.

Referring to FIG. 6, during a shutdown operation of turbine system 200, first control valve 270 and second control valve 272 are modulated such that cooled compressed air flows from compressed air storage 274 at a desired rate. In particular, in the exemplary embodiment, first control valve 270 is closed and second control valve 272 is fully opened. As a result, the air in compressed air storage 274 entirely flows through second regulation line 278 through second control valve 272 to bypass line 207 and is channeled to turbine section 208. As a result of bypassing thermal storage device 268, the compressed from thermal regulation system 266 is cooler than the compressed air exiting compressor section 204. In alternative embodiments, first control valve 270 and second control valve 272 are modulated such that compressed air flowing through bypass line 207 to turbine section 208 is any desired temperature. For example, first control valve 270 and second control valve 272 can be set to condition HGP components 140 even after a planned shutdown or before a startup. In such embodiments, first control valve 270 and/or second control valve 272 can be normally open such that compressed air storage 274 provides cooling flow even when an unplanned shutdown takes place.

Figure 7:
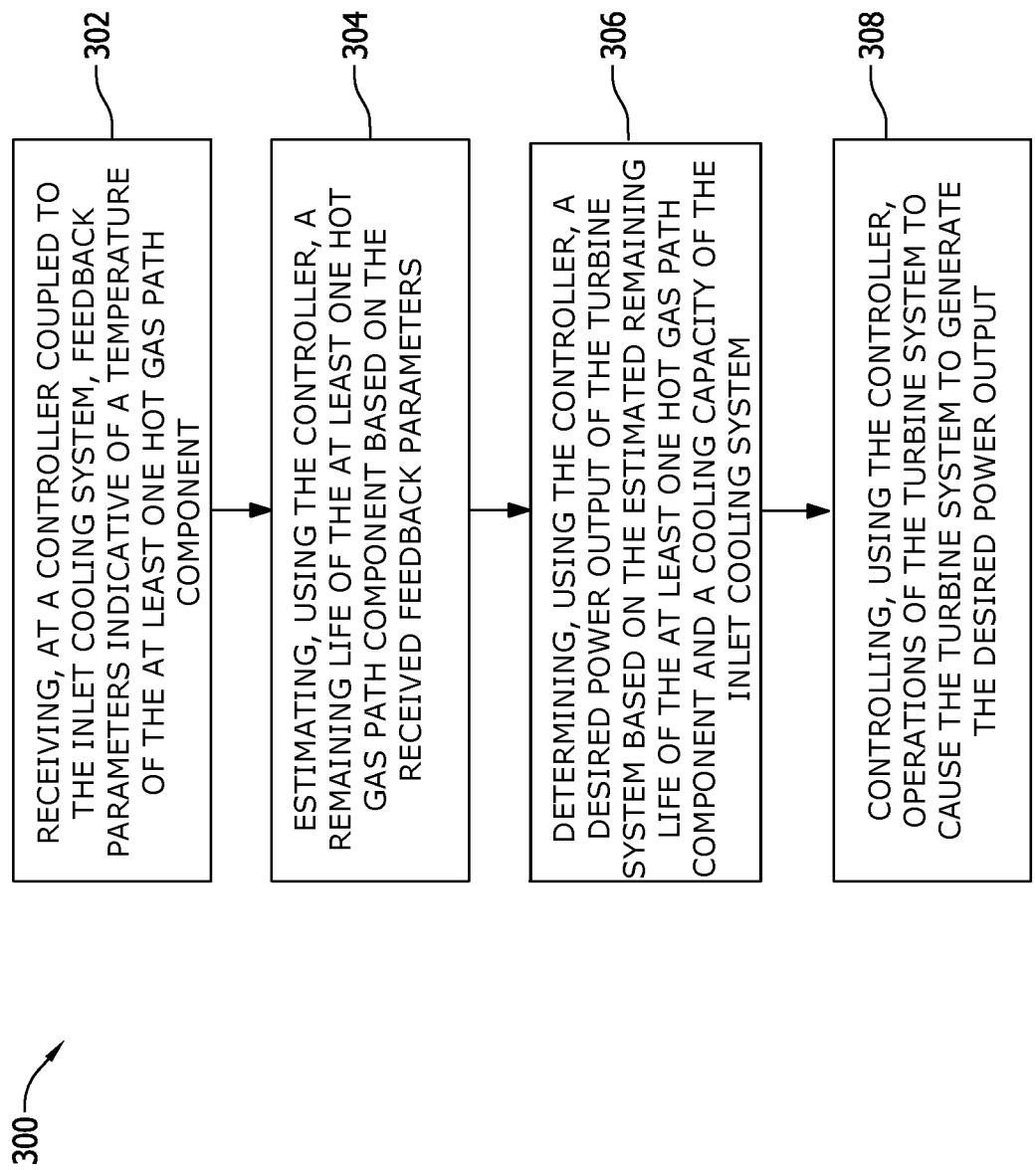
FIG. 7 is a flow diagram of an exemplary method of operating the turbine system shown in FIGS. 1-3.

FIG. 7 is a flow diagram of an exemplary method 300 of operating a turbine system 100, shown in FIGS. 1-3. Turbine system 100 includes compressor section 104, inlet cooling system 122, and turbine section 108 including a hot gas path component 140, each shown in FIG. 1. Method 300 includes receiving 302, at controller 144, shown in FIG. 1, coupled to inlet cooling system 122, feedback parameters indicative of a temperature of at least one hot gas path component 140. Method 300 also includes estimating 304, using controller 144, a remaining life of the at least one hot gas path component 140 based on the received feedback parameters. Method 300 further includes determining 306, using controller 144, a desired power output of turbine system 100 based on the estimated remaining life of the at least one hot gas path component 140 and a cooling capacity of inlet cooling system 122. Method 300 also includes controlling 308, using controller 144, operations of turbine system 100 to cause turbine system 100 to generate the desired power output.

Exemplary technical effects of the systems and methods described herein includes at least one of: (a) improved power output of turbine systems; (b) improved life span of HGP components; (c) reduced maintenance and servicing of HGP components; (d) improved safety in operation of turbine system; and (e) increased turbine system efficiency.

Exemplary embodiments of systems and methods for operating a turbine machine are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the gas turbine engine as described herein. Rather, the exemplary embodiment can be implemented and utilized in connection with many other rotary machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a turbine system including a compressor section, an intake housing coupled upstream of the compressor section for directing ambient air into the compressor section, an inlet cooling system including a chiller, a cooling pipe, and a coolant pump, the coolant pump being operable to drive a coolant from the chiller through the cooling pipe and into the intake housing to cool the ambient air entering the compressor section, and a turbine section coupled in flow communication with the compressor section and including at least one hot gas path component, said method comprising:
   receiving, at a controller coupled to the inlet cooling system, feedback parameters indicative of a temperature of the at least one hot gas path component;
   estimating, using the controller, a remaining life of the at least one hot gas path component based on the received feedback parameters;
   determining, using the controller, a cooling capacity of the inlet cooling system based on one or more operational characteristics of the chiller and the coolant pump;
   determining, using the controller, a desired power output of the turbine system based on the estimated remaining life of the at least one hot gas path component and the determined cooling capacity of the inlet cooling system; and
   controlling, using the controller, operations of the turbine system to cause the turbine system to generate the desired power output.

2. The method of claim 1, further comprising determining, using the controller, the temperature of the at least one hot gas path component based on the received feedback parameters.

3. The method of claim 1, further comprising:
   determining, using the controller, a desired operating temperature of the at least one hot gas path component based on the desired power output the turbine system and the determined cooling capacity of the inlet cooling system; and controlling, using the controller, the inlet cooling system to maintain the at least one hot gas path component at approximately the desired operating temperature.

4. The method of claim 1, further comprising determining, using the controller, an estimated effect of operation of the turbine system at the desired power output on the estimated remaining life of the at least one hot gas path component based on an operation history of boundary conditions of the at least one hot gas path component, the operation history of boundary conditions including a number of planned shutdowns of said turbine system to which the at least one hot gas path component was exposed, a number of unplanned shutdowns of the turbine system to the said at least one hot gas path component was exposed, and accumulated exposure times of the at least one hot gas path component to different temperatures.

5. The method of claim 1, further comprising receiving a cost parameter indicative of a cost associated with a change in lifetime to the at least one hot gas path component and a benefit parameter associated with operating the turbine at an increased power output, wherein determining the desired power output of the turbine system comprises:

estimating, using the controller, the temperature of the at least one hot gas path component at different control operations of the turbine system, the different control operations of the turbine system each associated with a generated power output;

determining, using the controller, a net benefit of operating the turbine system at each of the different operations of the turbine system based on the cost parameter, the benefit parameter, the estimated temperature of the at least one hot gas path component, the estimated remaining life of the at least one hot gas path component, and the efficiency at the respective generated power output associated with each of the different control operations;

selecting, using the controller, from the different control operations, a control operation associated with the largest net benefit; and determining, using the controller, the generated power output associated with the selected control operation.

6. A turbine system comprising:
a compressor section;
an intake housing coupled upstream of said compressor section for directing ambient air into said compressor section;
an inlet cooling system comprising a chiller, a cooling pipe, and a coolant pump, said coolant pump being operable to drive a coolant from said chiller through said cooling pipe and into said intake housing to cool the ambient air entering said compressor section;
a turbine section coupled in flow communication with said compressor section and comprising at least one hot gas path component; and
a controller configured to:
  receive feedback parameters indicative of a temperature of said at least one hot gas path component;
  estimate a remaining life of said at least one hot gas path component based on the received feedback parameters;
  determine a cooling capacity of said inlet cooling system based on one or more operational characteristics of said chiller and said coolant pump;
  determine a desired power output of said turbine system based on the estimated remaining life of said at least one hot gas path component and the determined cooling capacity of said inlet cooling system; and
  control operation of said turbine system to cause said turbine system to generate the desired power output.

7. The turbine system of claim 6, wherein said controller is further configured to determine the temperature of said at least one hot gas path component based on the received feedback parameters.

8. The turbine system of claim 6, wherein said controller is further configured to:
determine a desired operating temperature of said at least one hot gas path component based on the desired power output of said turbine system and the determined cooling capacity of said inlet cooling system; and
control said inlet cooling system to maintain said at least one hot gas path component at approximately the desired operating temperature.

9. The turbine system of claim 6, wherein said controller is further configured to determine an estimated effect of operation of said turbine system at the desired power output on the estimated remaining life of said at least one hot gas path component based on an operation history of boundary conditions of said at least one hot gas path component, the operation history of boundary conditions including a number of planned shutdowns of said turbine system to which said at least one hot gas path component was exposed, a number of unplanned shutdowns of said turbine system to which said at least one hot gas path component was exposed, and accumulated exposure times of said at least one hot gas path component to different temperatures.

10. The turbine system of claim 6, wherein said controller is further configured to receive a cost parameter indicative of a cost associated with a change in lifetime of said at least one hot gas path component and a benefit parameter indicative of a benefit of operating said turbine system at an increased power output, wherein said controller is configured to determine the desired power output of said turbine system by:
estimating the temperature of said at least one hot gas path component at different control operations of said turbine system, the different control operations of said turbine system each associated with a generated power output;
determining a net benefit of operating said turbine system at each of the different operations of said turbine system based on the cost parameter, the benefit parameter, the estimated temperature of said at least one hot gas path component, the estimated remaining life of said at least one hot gas path component, and the efficiency at the respective generated power output associated with each of the different control operations;
selecting from the different control operations a control operation associated with the largest net benefit; and
determining the generated power output associated with the selected control operation.

11. The turbine system of claim 10, wherein said controller is configured to determine the desired power output of said turbine system based on at least one of fuel cost, load demand, and electricity price.

12. The turbine system of claim 6, further comprising a sensor coupled in communication with said controller and configured to detect and send the feedback parameter indicative of the temperature of said at least one hot gas path component.

13. The turbine system of claim 6, further comprising a combustor section coupled downstream from said compressor section, said combustor section configured to burn a fuel provided at a fuel flow rate to generate high temperature combustion gases.

14. The turbine system of claim 13, wherein said controller controls operation of said turbine system by adjusting at least one of the fuel flow rate, an inlet guide vane, and said inlet cooling system.

15. The turbine system of claim 6, wherein said controller is configured to determine the desired power output of said turbine system based further on a determined desired operating temperature of said at least one hot gas path component, wherein the determined desired power output is a maximum power output of the turbine system at which said at least one hot gas component is maintained at the desired operating temperature.

16. The turbine system of claim 6, further comprising a bypass line extending between said compressor section and said turbine section for channeling a portion of compressed ambient air from said compressor section as coolant air to cool said at least one hot gas path component.

17. The turbine system of claim 16, further comprising a temperature sensor coupled to said bypass line and operable to detect a temperature of the coolant air.

18. The turbine system of claim 17, wherein said controller is further configured to determine the temperature of said at least one hot gas path component based on the detected temperature of the coolant air, and wherein said controller estimates the remaining life of said at least one hot gas path component based on the determined temperature of said at least one hot gas path component.

19. The turbine system of claim 17, further comprising a combustor section coupled downstream from said compressor section, said combustor section having a combustor configured to burn a provided fuel to generate high temperature combustion gases at an exit of the combustor, wherein said controller is further configured to determine the temperature of gases exiting the combustor based on the detected temperature of the coolant air and a fuel to air ratio within the combustor.

* * * * *